US011541426B2

(12) United States Patent
Huber et al.

(10) Patent No.: US 11,541,426 B2
(45) Date of Patent: Jan. 3, 2023

(54) SORTING APPARATUS WITH A LIBS LASER DEVICE

(71) Applicant: BINDER + CO AG, Gleisdorf (AT)

(72) Inventors: Reinhold Huber, Fürstenfeld (AT); Reinhard Taucher, Kumberg (AT)

(73) Assignee: BINDER + CO AG, Gleisdorf (AT)

(*) Notice: Subject to any disclaimer, the term of this patent is extended or adjusted under 35 U.S.C. 154(b) by 0 days.

(21) Appl. No.: 17/470,691

(22) Filed: Sep. 9, 2021

(65) Prior Publication Data
US 2022/0072589 A1 Mar. 10, 2022

(30) Foreign Application Priority Data
Sep. 10, 2020 (EP) .................................... 20195574

(51) Int. Cl.
*B07C 5/342* (2006.01)
*B07C 1/04* (2006.01)
*G01N 21/63* (2006.01)

(52) U.S. Cl.
CPC ................ *B07C 5/342* (2013.01); *B07C 1/04* (2013.01); *G01N 21/63* (2013.01)

(58) Field of Classification Search
CPC .. B07C 1/04; B07C 5/02; B07C 5/342; B07C 2501/0018; G01N 21/63
See application file for complete search history.

(56) References Cited

U.S. PATENT DOCUMENTS

| | | | | |
|---|---|---|---|---|
| 6,008,897 A | * | 12/1999 | Sabsabi | G01N 21/718 356/318 |
| 6,795,179 B2 | * | 9/2004 | Kumar | B07C 5/366 209/579 |
| 8,319,964 B2 | * | 11/2012 | Hahn | G01N 21/718 356/318 |
| 10,088,425 B2 | | 10/2018 | Buckley et al. | |
| 10,710,119 B2 | * | 7/2020 | Kumar | G06N 3/08 |
| 2017/0205354 A1 | * | 7/2017 | Buckley | B07C 5/3425 |
| 2017/0261437 A1 | * | 9/2017 | Buchter | G01J 3/443 |
| 2018/0147607 A1 | | 5/2018 | Comtois et al. | |

FOREIGN PATENT DOCUMENTS

| | | |
|---|---|---|
| EP | 3 352 919 B1 | 1/2019 |
| EP | 3 158 324 B1 | 8/2019 |

OTHER PUBLICATIONS

European Search Report issued in European Patent Office Patent Application No. 20195574.7, dated Feb. 3, 2021.

* cited by examiner

*Primary Examiner* — Michael Mccullough
*Assistant Examiner* — Kalyanavenkateshware Kumar
(74) *Attorney, Agent, or Firm* — Greenblum & Bernstein, P.L.C.

(57) ABSTRACT

Sorting apparatus including a chute, on which objects are moved in succession by gravitational force, the chute having a cutout with a measuring region. An LIBS laser device is arranged adjacent to the cutout to carry out spectroscopic measurement on the moving objects. A separating device separates out certain objects, and a control device controls and/or adjusts the separating device as a function of the measurement results of the LIBS laser device. The chute includes at least a first portion, through which the objects can be moved first and centered normal to the conveying direction by gravitational force, and a second portion that is flat. The cutout includes the measuring region is arranged in the second portion.

21 Claims, 9 Drawing Sheets

SORTING APPARATUS WITH A LIBS LASER DEVICE

CROSS-REFERENCE TO RELATED APPLICATION

This application claims priority under 35 U.S.C. § 119(a) of Europe Application No. EP 20195574.7 filed Sep. 10, 2020, the disclosure of which is expressly incorporated by reference herein in its entirety.

FIELD OF THE INVENTION

The invention relates to a sorting apparatus for sorting objects, the sorting apparatus comprising at least
- a chute, on which chute the objects can be moved in succession in a conveying direction by means of the acting gravitational force, wherein the at least one chute has a cutout comprising a measuring region,
- a LIBS laser device, wherein the LIBS laser device is arranged adjacent to the cutout of the chute in order to carry out, through the cutout, a spectroscopic measurement on the objects moving along the chute,
- a separating device for separating out certain objects, and
- a control device for controlling and/or adjusting the separating device as a function of the measurement results of the LIBS laser device. The invention also relates to a sorting method.

PRIOR ART

The use of LIBS (Laser Induced Breakdown Spectroscopy) in connection with sorting apparatuses is already known in the prior art. The LIBS method is used in particular in connection with the sorting of metals and ores, in order to obtain a rapid analysis of the metals or ores present. LIBS is an analytical method in which a pulsed, focused laser beam extremely heats a small area on the material surface of an object, generates a plasma, and thereafter enables a quantitative, element-based spectral analysis of the plasma. Measuring the intensities of individual spectral lines of different elements makes it possible to deduce the atomic composition of the object. The recorded spectrum of the material can be used to identify materials, to ascertain the content of certain chemical elements or chemical compounds in the object and thus almost as a fingerprint for a certain type of object.

In order to be able to measure by means of a LIBS laser device the objects to be sorted in the sorting apparatus, the prior art discloses concave chutes on which the objects are moved, preferably by means of gravitational force, so that they move past the LIBS laser device, which is arranged below the chute, see for instance EP 3 158 324 B1 and EP 3 352 919 B1.

One disadvantage of concave chutes is that, due to the concave shape of the chute, objects to be sorted are located at different distances from the base of the chute and thus at different distances from the LIBS laser device, depending on their shape and size, which leads to focusing problems for the LIBS laser, as a result of which the measurement results of the LIBS laser device are often inadequate.

OBJECT OF THE INVENTION

The object of the present invention is to overcome the disadvantages of the prior art and to provide an improved sorting apparatus using a LIBS laser device.

SUMMARY OF THE INVENTION

The object of the invention is achieved by a sorting apparatus for sorting objects, the sorting apparatus comprising at least
- a chute, on which chute the objects can be moved in succession in a conveying direction by means of the acting gravitational force, wherein the chute has a cutout comprising a measuring region,
- a LIBS laser device, wherein the LIBS laser device is arranged adjacent to the cutout of the chute in order to carry out, through the cutout, a spectroscopic measurement on the objects moving along the chute,
- a separating device for separating out certain objects, and
- a control device for controlling and/or adjusting the separating device as a function of the measurement results of the LIBS laser device, wherein it is provided according to the invention that the chute comprises at least two portions, wherein the first portion, through which the objects can be moved first, is designed in such a way that the objects moving along the first portion are centred normal to the conveying direction by means of gravitational force, and the second portion of the chute is designed to be flat, and that the cutout comprising the measuring region is arranged in the second portion of the chute.

A chute is an element which in the operating state is arranged at least partially in an inclined manner and along which objects can slide solely by means of gravity, wherein the objects move through a first portion and then through a second portion on the chute. The first and the second portion have a different shape of the cross-section normal to the conveying direction.

A first portion, in which objects moving along therein are centred normal to the conveying direction by means of gravitational force, will be understood to mean in particular such portions in which, due to the shape of said portion, the objects are conveyed into the middle of the first portion, transversely to the conveying direction, by means of the acting gravitational force. Objects are usually centred by means of the gravitational force when the first portion has two partial conveying surfaces which are inclined with respect to one another and which form part of the overall conveying surface. The inclined partial conveying surfaces, which may be straight or curved in cross-section, are usually connected to one another at a deepest region of the chute. In a cross-section of the first portion normal to the conveying direction, the deepest region of the chute corresponds to a deepest point or a deepest portion.

As seen in a cross-section of the first portion normal to the conveying direction, the inclined partial conveying surfaces are usually arranged symmetrically to one another, in particular symmetrically in relation to a plane which is vertical in the operating state of the sorting apparatus and which extends in the conveying direction. However, it is not ruled out that the inclined partial conveying surfaces are not arranged symmetrically to one another since, as seen in a cross-section of the first portion normal to the conveying direction, they may for example each have a different angle to a plane which is vertical in the operating state of the sorting apparatus and which extends in the conveying direction (for instance a V-shaped cross-section tilted to the side); or may for example have the same angle to the plane which is vertical in the operating state of the sorting apparatus and which extends in the conveying direction, but have a different length in cross-section (for instance a V-shaped cross-section having side walls of unequal height); or may for example have both different angles and different lengths in cross-section (for instance a V-shaped cross-section tilted to the side and having side walls of unequal height).

Due to the inclined partial conveying surfaces and the gravitational force acting on the objects, the objects are conveyed to the deepest point or region of the cross-section of the chute. The objects therefore move closer and closer to the deepest point of the chute as they slide through the first portion along the conveying direction. The conveying surface will be understood here to mean that surface of the chute on which the objects can rest on account of the gravitational force.

It may therefore be provided in one embodiment of the invention that the first portion, more specifically the conveying surface thereof, is designed to be concave since the conveying surface of the first portion, as seen in section normal to the conveying direction, is arranged at least partially in an inclined manner, namely with respect to portions of the cross-section extending normal to the conveying direction, and that the second portion has no conveying surface that is arranged in an inclined manner, as seen in section normal to the conveying direction.

Due to this concave shape of the first portion of the chute, an object is centred in this first portion by means of gravitational force on account of the inclined conveying surfaces. As a result, a concave shape is no longer necessary in the second portion of the chute, where the spectroscopic measurement takes place.

A concave shape of the first portion of the chute with a conveying surface which is at least partially inclined will be understood in this context to mean that the cross-section of the chute, in a plane at right angles to the conveying direction, forms a depression for objects to be sorted, and this cross-section has at least one inclined portion.

The cross-section of the first portion of the chute, more specifically the cross-section of the conveying surface, may for example be U-shaped, V-shaped, may have the shape of a circular arc, for example a semicircle, may have the shape of a polyline, for example a polyline approximating a circular arc shape. However, the cross-section of the first portion of the chute cannot be rectangular, i.e. cannot have a conveying surface which is flat in the operating state of the sorting apparatus, which is horizontal in cross-section, and which has perpendicular side walls: this is because an object would only be thrown back and forth between the side walls, but would not be centred in the middle of the first portion.

It is not ruled out that the first and/or second portion of the chute have a cross-section which is closed at least in one length portion and which encloses on all sides, normal to the conveying direction, the objects to be sorted. The chute would then be a tube in this length portion, for example having a circular cross-section; or having a triangular cross-section by additionally closing a V-shaped cross-section at the top.

The second portion of the chute is designed to be flat, that is to say has a flat conveying surface, because a centring of the object is no longer necessary since the centring takes place in the first portion of the chute and the object, when it passes from the first portion into the second portion, continues to move on this path predefined by the first portion in the conveying direction in the second portion, namely over the measuring region of the cutout.

A flat shape of the second portion of the chute will be understood in this context to mean that the cross-section of the chute, more specifically of the conveying surface, in a plane at right angles to the conveying direction is in the form of a straight line. This straight line is oriented horizontally in the operating state of the sorting apparatus. There are no inclined conveying surfaces in the second portion, as seen in the operating state and in cross-section.

In order to be able to sort the objects by means of the sorting apparatus, the objects are measured in temporal succession per chute, in particular spectroscopically measured. As seen in the conveying direction of the objects, a device for singulating the objects may also be provided upstream of the at least one chute. As a device for singulating the objects, a vibrating channel and/or a conveyor belt may be provided for example, and/or a plate oriented at an angle in the operating state of the sorting line, by means of which the objects to be sorted can be singulated so that they enter the first portion of the chute individually. Appropriate devices for singulating the objects are already known from the prior art.

Measuring in succession means that multiple objects are not located on top of one another or, as seen normal to the conveying direction, next to one another. It is best if the individual objects are spaced apart from one another in the conveying direction, so as to be able to be recognized as individual objects.

As objects to be sorted, consideration is given in particular to objects made of metal or metal mixtures as well as objects made of ore or ore mixtures, or excavated material consisting of refractory material, in particular for recycling the linings of smelting furnaces. However, it is not ruled out that objects made of other materials are also sorted by the sorting apparatus, provided that they can be identified and measured using the apparatus according to the invention.

Objects may be made of different materials, for example of two, three or even more different materials, or only of one material. A material here will be understood to mean a chemical element or a chemical compound. The object stream, which is optionally produced by the device for singulating the objects, may also consist exclusively of objects which all contain a certain material. The object stream would then be sorted for instance into fractions having a different content of this material, as required in ore processing. However, the object stream may also contain objects made of different materials, such as different ores or different metals, which are then sorted into different material fractions with the aid of the sorting apparatus. Each material fraction could in turn be further sorted into fractions having a different content of this material. For example, objects having a different content of a certain element could be separated from one another using the apparatus according to the invention. It is also possible to sort different types of metals or metal alloys, for example aluminium alloys. Furthermore, the method according to the invention can be used to find contaminants in the object stream, a contaminant being an object that contains none of the desired materials. If desired, the contaminants can also be precisely identified by means of LIBS analysis. It goes without saying that the set-up and equipment of the device, in particular the laser power and the wavelength of the detector, are adapted in each case to the material to be sorted or to the objects to be sorted.

The method according to the invention also encompasses the situation where not all the contaminants or objects corresponding to the sought criterion (material, content, etc.) are suitably separated out, and therefore errors may occur in the sorting. Such an oversorting or undersorting of the objects therefore does not depart from the concept of the invention.

According to the invention, the sorting apparatus comprises at least one chute. Chutes on which objects can be moved by means of gravitational force are well known in the prior art, for instance in the form of channels or inclined planes. Chutes, as used together with sorting apparatuses of the prior art, serve to keep in the middle the objects to be measured by means of a LIBS laser device, so that they are guided in the sorting apparatus and can be irradiated by a LIBS laser device. The chutes known from EP 3 158 324 B1 and EP 3 352 919 B1 consist of a single portion in the sense that the cross-section of the chute does not vary over the length of the chute.

The location of the object on the chute, and thus the arrival thereof at the separating device, can usually take place by means of the LIBS measurement of the LIBS laser device: at the time of the LIBS measurement, a certain object is located in the measuring region and it can be determined when this object will arrive at the separating device. Especially in the case of continuous LIBS measurement, it would also be possible in principle to determine the length of an object by means of the LIBS measurement since the frequency of the continuous LIBS measurement is known, and it can be deduced from multiple successive LIBS measurements that this is an object of corresponding length.

However, a dedicated object recognition device may be provided in the apparatus according to the invention, which object recognition device is designed to detect at least the position of an object on the chute, that is to say the orientation of the object relative to the chute, and additionally the shape and the dimensions of the object. This means that the object recognition device can recognize, for example, how the object is lying relative to the measuring region and/or the separating device, for instance whether an object is lying transverse to the conveying direction. In general, the object recognition device records only a two-dimensional image, but it is of course not ruled out that three-dimensional images are also created. The control device according to the invention for controlling and/or adjusting the separating device would optionally be controlled as a function of the measurement results of the object recognition device and the LIBS laser device. If necessary, the control device could also perform an independent adjustment of the separating device, for example of the air quantity of a blow-out device, independently of the measurement results of the object recognition and/or the LIBS laser device.

As the object recognition device, consideration is given in particular to a VIS camera and an LED and/or laser illumination means, so that two- or three-dimensional images of the objects can be created, but of course a different device for recognizing objects is also not ruled out from being used in connection with the present invention. It is also not ruled out that the object recognition device detects more parameters than just the position of an object, for example the size (length and/or width) and/or the shape and/or the colour and/or spectral properties in the NIR range (if the object recognition device contains an NIR camera) and/or the structure and/or the height of the object. It will be understood that the height can only be determined from three-dimensional images or from multiple two-dimensional images.

A dedicated object recognition device may improve the classification of the objects by providing more information about the nature of the objects. It may improve the separation because the separating device can react to the position and/or shape of the objects.

If an object recognition device is present, it may also—instead of using the LIBS laser device for this—determine the current location of the objects so that the control device can calculate when this object will arrive at the separating device.

An object recognition device can in principle be used for all sorting apparatuses comprising a LIBS laser device; it is not limited to sorting apparatuses comprising a chute or comprising a chute according to the invention.

The sorting apparatus according to the invention comprises a LIBS laser device for carrying out an analysis of the object moving on the chute past the LIBS laser device. The LIBS laser device in this case comprises at least one laser and a detector for measuring the spectrum. With the LIBS laser device, it is possible either merely to identify the object by way of the spectrum of the individual chemical elements contained therein and/or to carry out a quantitative analysis. This means that, by means of the LIBS laser device, it can be determined on the one hand whether the object contains the predefined material, that is to say a certain chemical element or a certain chemical compound, and on the other hand also what content of this chemical element or chemical compound the object contains.

In order to be able to carry out the LIBS measurement, a cutout comprising a measuring region is provided in the chute. The cutout must in any case have such dimensions that the laser beam can reach the object in order to carry out the laser-induced plasma spectroscopy and also it is possible to measure the plasma generated by the laser beam. The measuring region is located at the point where the laser beam passes through the cutout in the operating state of the apparatus. This means that, in terms of its size, the cutout either corresponds to the measuring region or else is larger than the measuring region. However, the measuring region in any case defines where the LIBS measurement of the objects takes place.

The sorting apparatus according to the invention further comprises a separating device which separates an object that has been defined as containing a certain material, for example a certain metal or a certain ore, from other objects of the object stream if the LIBS analysis has delivered a result to this effect, wherein the result of the LIBS analysis may also include the result of the evaluation of an object recognition device that may be present, for instance the size and/or the colour of the object.

Whether the valuable objects are separated out from the non-valuable objects during the separation, or vice versa, is not important and depends for example on which of the two fractions contains the greater number of objects or is determined by qualitative aspects. A fraction may for example be separated out by means of blow-out nozzles using compressed air. Of course, it is not ruled out that separating devices other than blow-out nozzles are used to separate out the objects.

It is also not ruled out that more than one fraction is separated out by the separating device, so that for example two different metals or ores are separated out separately.

The chute according to the invention differs from chutes known from the prior art since it comprises at least two portions, wherein the second portion of the chute is designed to be flat. Since the second portion is designed to be flat, the objects to be sorted rest fully or at least with multiple bearing points on the conveying surface of the chute, wherein the bearing points are all at the same normal distance from the LIBS laser device. This leads to a higher measurement accuracy since the LIBS analysis requires that the object is spaced as constantly as possible from the laser device. In the case of a concave chute, it is possible that the object to be measured does not rest on the deepest point of the chute—as seen in cross-section—and is therefore further away from the laser device. The measurement distance from the laser thus varies, depending on the object shape and the object size. For a low variance of the measurements performed, however, a narrow size range or a low object size variance is required. If this condition is not met, the measurements are negatively affected or inconsistent measurements are carried out, which is associated with a higher susceptibility to errors.

According to the invention, it is further provided that the cutout for carrying out the LIBS measurement is arranged in the second portion of the chute. This ensures that on the one hand the objects are in singulated form and thus can be measured in succession, and on the other hand ensures that, due to the flat design of the second portion, the objects are always at substantially the same distance from the LIBS laser device, with less dependence on object size or shape, since all the bearing points of the objects lie in the plane of the second portion. The cutout is usually arranged in the middle of the chute, that is to say at an equal distance from the sides of the chute.

However, it of course cannot be ruled out that some objects, due to their particular external shape, are at a distance from the flat conveying surface of the second portion at the point where the laser beam impinges on the object.

In principle, the sorting of the materials takes place in such a way that first an object stream formed of individual objects is produced, in order to be able to measure the objects in succession. The objects then arrive in succession at the chute and move along the chute by means of gravity. The concave first portion of the chute centres the objects in the middle of the chute normal to the conveying direction, and thus also over the measuring region in the second portion of the chute.

It may be provided that an object recognition device first detects each individual object and transmits data to the control device, which is also included in the apparatus. In this case, after receiving the data from the object recognition device, the control device then transmits a signal to the LIBS laser device, so that the LIBS measurement starts at the right moment in the case where the LIBS laser device is designed to emit laser radiation only when an object is present at the cutout.

However, it may also be that no object recognition takes place before the LIBS laser measurement, but rather only after or at the same time as the LIBS laser measurement. In this case, laser radiation is continuously emitted in pulsed form from the LIBS laser device. The LIBS measurement likewise takes place continuously, wherein a successful measurement with suitable data can be obtained only when an object is located in the measuring region. Otherwise, only so-called empty measurements are carried out. After the LIBS measurement, the control device receives data from the LIBS laser device and/or from the object recognition device, if the latter takes place at the same time as or after the LIBS measurement, and depending on the result sends a corresponding signal to the separating device, which then divides the objects into the appropriate fractions, for example places them in different containers, for example by blowing them out.

As the control device, consideration is given in particular to a computer which enables automated control and/or adjustment of the sorting apparatus according to the invention. The sorting apparatus according to the invention is therefore able on the one hand to identify the object, that is to say to ascertain whether the object contains the desired material, and on the other hand also to determine the content of said material possibly contained therein. In addition, the control device is able to evaluate signals and data from the LIBS laser device and from the object recognition device, if present, and to instruct the separating device accordingly.

It is provided in one embodiment of the invention that the chute has a width and the second portion of the chute has a lower end, and that the measuring region of the cutout is arranged at least half the width of the chute above the lower end of the second portion of the chute in order to ensure that the measurement distance, that is to say the distance between the LIBS laser and the object located in the measuring region, is as constant as possible because the object rests on the chute. By contrast, the measurement distance would vary to a greater extent if the LIBS measurement is not carried out until the end of the chute or even after the object has left the chute.

Since the measurement of the object takes place at least half the width of the chute above the lower edge of the second portion, the risk that the object will pass the separating device before the latter receives a separating-out signal from the control device, due to the speed at which the object moves on the chute, is in any case also reduced.

It is provided in one embodiment of the invention that the cutout of the chute extends in the form of a slot in the conveying direction as far as the lower end of the second portion of the chute, wherein the measuring region of the cutout, as seen in the conveying direction, is arranged at a distance from the lower end of the second portion of the chute, in particular is arranged at the region of the slot located furthest away from the lower end of the second portion of the chute. This prevents accumulated dust or other dirt from impairing the LIBS measurement.

The open slot shape of the cutout prevents dirt that is brought onto the chute by the objects to be sorted from accumulating in the cutout at the end of the cutout. It also prevents the objects from becoming caught at the lower edge of the cutout, which lower edge does not even exist in this case, and thus from negatively affecting the detection and/or separation of the objects.

Another embodiment of the invention provides that a depression adjoins the cutout in the conveying direction, in particular towards the lower end of the second portion of the chute. This means that the cutout is closed at the lower end of the second portion and is not open as in the case of an open slot. The end of the cutout forms, for example, a web lying in the plane of the second portion, which shields the laser and prevents objects from being able to protrude through the cutout in the direction of the laser and possibly damaging the laser, and/or prevents dust from passing through the cutout to the laser and soiling the latter.

In this embodiment, too, the objects are prevented from becoming caught at the lower edge of the cutout and thereby negatively affecting the detection and/or separation of the objects. The width of the depression, measured normal to the conveying direction, preferably corresponds to the width of the cutout, measured normal to the conveying direction. The width of the cutout is usually a fraction of the width of the second portion of the chute. The width of the cutout is usually less than 50% of the minimum object size. If it is assumed that the width of the second portion is at least twice that of the largest object to be sorted, the width of the cutout is thus usually less than 25% of the width of the second portion, for example less than 15% of the width of the second portion, in particular less than 12%, preferably less than 10%.

In one embodiment of the invention, the web has a thickness which is reduced in comparison to the material thickness of the second portion outside of the cutout, so that a depression in the conveying surface of the chute is formed in the continuation of the cutout. By virtue of this design, on the one hand less dirt can accumulate in the cutout, and on the other hand objects are prevented from damaging the LIBS laser device through the cutout since the laser is shielded by the web. The material thickness may be reduced for example by 40-70%, for example by 50%.

Also in this embodiment with the depression, the measuring region of the cutout is arranged at a distance from the lower end of the second portion of the chute, as seen in the conveying direction, in particular at the region of the cutout located furthest away from the lower end of the second portion of the chute. The cutout may be circular or may have the shape of a slot oriented in the conveying direction.

In conventional LIBS devices, such cutouts are not slot-shaped or designed with a depression thereafter, but instead are for example circular, which causes dirt to accumulate and deposit at the edge of the circular cutout over time, thereby impairing the LIBS laser measurement.

Due to the fact that the first portion of the chute has a centring effect, the first portion in any event has walls at least to some extent. In order to prevent the objects to be sorted from falling off the side of the chute before or after the LIBS measurement in the second portion of the chute and thus not being able to be correctly separated, it is provided in one embodiment of the invention that the second portion of the chute comprises side walls along the chute, which side walls extend vertically, as seen in section normal to the conveying direction, in order to keep an object on the second portion. Particularly in the case of objects which would not remain in the middle in the second portion of the chute, but instead would fall off the side of the chute or slide onto an adjacent chute, it is provided that the chute has side walls in the second portion. These side walls are designed to be flat and are arranged normal to the flat bearing surface of the second portion. The side walls serve for lateral guidance and are not a bearing surface or conveying surface for the objects. These side walls cannot serve to centre the object in the middle of the second portion because they do not have inclined partial conveying surfaces.

In order to be able to produce the second portion of the chute in a particularly cost-effective manner and only with a base, it is provided in one embodiment of the invention that the second portion of the chute comprises no side walls. This is because the centring, in particular concave, first portion usually ensures a movement in a straight line, which is continued by the objects in the second portion anyway. The second portion of the chute would then comprise only a flat bearing surface.

It would also be conceivable that the second portion has side walls in some areas and no side walls in other areas.

In order to work as cost-effectively as possible in terms of energy costs, it is provided in one embodiment of the invention that the LIBS laser device is designed to emit laser radiation only when an object is present at the cutout, that is to say discontinuously. By emitting pulsed laser radiation only when an object is present in the measuring region, it is possible to work more energy-efficiently since laser radiation only has to be emitted for the measuring process.

In the case of discontinuously emitted laser radiation, an object recognition device may be provided, which is designed to detect at least the position of an object on the chute, wherein the object recognition device is arranged upstream of the LIBS laser device, as seen in the conveying direction of the objects. Arranging the object recognition device upstream of the LIBS laser device, as seen in the conveying direction of the objects, is also possible when using continuous laser radiation.

The object to be sorted first moves on the chute past the object recognition device, which detects the presence of an object. The control device then transmits a signal to the LIBS laser device, as a result of which the latter emits a laser beam onto the object at the right moment in order to carry out laser-induced plasma spectroscopy on the object so as to identify the object.

To prevent the laser from having to be constantly switched on and off, and thus to extend the service life of the laser, it is provided in one preferred embodiment of the invention that the LIBS laser device is designed to emit laser radiation continuously, and that the sorting apparatus further comprises a laser dump for absorbing the laser radiation, wherein the laser dump is arranged opposite the LIBS laser device with respect to the chute, as seen in the direction of the laser radiation. This prevents any damage from being caused to an enclosure or in the surroundings of the sorting apparatus or to people by means of the laser, which constantly emits in the same direction.

One advantage of continuous laser radiation is that the LIBS laser measurement is independent of the data from the control device, which the latter receives from the object recognition device, and/or an object recognition device would not necessarily be required for this purpose. In any event, in the case of continuous laser radiation, the position of an object recognition device, when present, can be selected independently of the position of the LIBS laser device (and the measuring region) according to optimal design or separation criteria.

Due to the fact that a pulsed laser beam is constantly emitted by the LIBS laser device, it is not necessary for the control device to transmit a measurement signal to the LIBS laser device. If no object is present in the measuring region, however, only an empty measurement will be carried out.

Particularly in the case of continuous laser radiation, an object recognition device may be provided, which is designed to detect at least the position of an object on the chute, wherein the object recognition device may also be arranged downstream of the LIBS laser device, as seen in the conveying direction of the objects.

Particularly in the case of continuous laser irradiation of the objects, the object recognition may take place after or at the same time as the LIBS laser measurement. The object first moves past the LIBS laser device, wherein first a laser-induced plasma spectroscopy is carried out on the object so as to identify the object, and thereafter or at the same time the object recognition takes place in order to enable the separating device to receive data about the object, via the control device, so that the appropriate sorting pattern, in particular blow-out pattern, is achieved.

In contrast to the discontinuous mode of operation, in a continuous mode of operation the LIBS laser device is not dependent on the object recognition data. It also goes without saying that, if the object recognition device is arranged upstream of the LIBS laser device, as seen in the conveying direction of the objects, both a discontinuous and a continuous use of the laser is possible, whereas only the continuous emission of laser radiation is possible if the object recognition device is arranged at or downstream of the LIBS laser device.

Object recognition after the LIBS laser measurement has the advantage that the LIBS laser device is arranged further up the chute, as seen in the conveying direction of the objects, so that the objects have yet to travel a longer distance before reaching the separating device, which leaves more time for the transmission of information from the LIBS laser device to the control device and thus, where necessary, for activation of the separating device by the control device. A LIBS laser measurement, that is to say the measurement, the evaluation thereof (which takes the most time) and the transmission of the result to the control device, usually takes longer than the object recognition, that is to say the measurement of the position and/or shape of the object and the transmission of the result to the control device.

If an object recognition device is provided, better sorting can be achieved by the separating device since the separating device can be better adapted to the specific parameters of the objects, for instance the position or shape of the objects. For instance, the separating device may be set in a targeted manner with regard to the strength and/or the direction of actuation. For example, in the case of blow-out nozzles, the strength of the air flow and/or the duration of the air pulses and/or the point of impact of the air flow on the object can be adapted in order to achieve suitable sorting.

The sorting apparatus may be designed in such a way that an object is spectroscopically measured multiple times, wherein a measurement is carried out on the object preferably at least every 4.5 mm to 5 mm. Multiple times means that each object is measured at least twice, and at least one of these two measurements must be successful in order for the object to be able to be defined and thus sorted. Of course, it is not ruled out that the distances between the individual measurements are adapted in each case to the size of the objects to be sorted, so that for example there is a larger or smaller spatial distance between the measurements. Therefore, measurements for example every 1 to 2 mm, every 2 to 3 mm, every 3 to 4 mm, every 4 to 5 mm, every 5 to 6 mm, every 6 to 7 mm, every 7 to 8 mm, every 8 to 9 mm or every 9 to 10 mm would be conceivable.

Sorting takes place when the measurement at at least one measurement point has been successful. Particularly when using continuously emitted pulsed laser beams, there will be multiple measurement points. The measurements can in general typically be performed at a frequency of 500-600 Hz; frequencies of 1000 Hz or more are conceivable.

If there are multiple measurement points per object, multiple different materials may also be identified at different locations on a single object.

As already mentioned, sorting takes place only if at least one measurement point on an object has a successful measurement. If there is no successful measurement, the measurement is a so-called empty measurement and the object will be separated according to the qualitative objectives of the desired objects. If there are multiple measurements for an object which include both at least one material classification, that is to say a valid measurement, and an empty measurement, the object can be assigned to a fraction based on the ratio of the number of valid and empty measurements, optionally with further parameterization.

It is provided in one embodiment of the invention that the sorting apparatus further comprises a distance measuring device for determining the distance of the objects on the chute from the LIBS laser device. By means of the distance measuring device, the distance of the surface to be measured on the object from the LIBS laser device can be determined prior to the LIBS measurement and thus deviations resulting from uneven object surfaces can be taken into account, as a result of which measurement inaccuracies can be prevented and/or the individual measurements can be selected depending on the distance.

The flat bearing surface of the second portion of the chute usually adjoins the deepest point of the cross-section of the first portion. It is provided in one embodiment of the invention that the transition from the first portion to the second portion of the chute is abrupt, as a result of which it is not necessary to manufacture a transition portion. Abrupt means that the cross-section of the chute changes in a manner that is not smooth, for instance there is sometimes a step in the conveying surface. Due to the abrupt transition, the chute is particularly easy to manufacture since there is no need for a transition portion that enables a gradual transition from a concave chute to a flat chute.

If the objects to be sorted so require, it is provided in one embodiment of the invention that a region of the first portion that adjoins the second portion is designed as a transition portion in order to enable a gradual transition from the first portion to the second portion. A gradual transition means a smooth transition without steps in the conveying surface. In particular, if the transition portion enables a gradual transition from the concave portion to the flat portion of the chute, this is associated with increased effort from a manufacturing point of view. A gradual transition from the first portion of the chute to the second portion of the chute is necessary in particular when the external shape of the objects to be measured makes this necessary, for instance because the objects would be strongly deflected from their path in the event of an abrupt transition and would not move as intended over the cutout for the LIBS measurement.

In order to prevent a build-up of objects on the chute, it is provided in one embodiment of the invention that the width of the chute in the first portion increases as seen in the conveying direction of the objects. Preferably, the widening of the first portion is achieved by bending a flat sheet with edges arranged at an angle to one another.

The angle of inclination of the chute relative to the horizontal in the operating state of the sorting apparatus should not be too large since the individual objects then lift away from the chute, in particular from the base of the chute, and fall down instead of sliding. The inclination of the chute is adapted to the objects to be sorted in order to achieve a sorting result that is as ideal as possible. By way of example, for aluminium scrap comprising parts having a size between 40 mm-100 mm, an inclination of approximately 50° is suitable. The sorting result is also negatively affected by too small an inclination since the objects then slide too slowly, which can result in a build-up of material. Particularly in the case of flat parts, an angle of inclination of approximately 70° is suitable, as a result of which the throughput can be increased, whereas a smaller angle of inclination will be selected in the case of parts that are more spherical.

Therefore, in order to achieve particularly good sorting of the objects, it is provided in one embodiment of the invention that the chute has an angle of inclination of 40° to 70°, preferably 50°. The angle of inclination between 40° and 70°, preferably 50°, means that the objects neither slide too slowly and thus cause a build-up of objects, nor slide too quickly and thus lift away from the base of the chute.

It is provided in one embodiment of the invention that the sorting apparatus further comprises a device for singulating the objects, wherein the device for singulating the objects has a smaller inclination than the chute in order to be able to produce a single object stream prior to sorting. As a device for singulating the objects, consideration is given in particular to vibrating channels or other vibrating devices which singulate the objects by way of an appropriate amplitude. To prevent the objects from passing too quickly through the singulating device, it is provided that the vibrating channel has a smaller inclination than the chute.

It is not necessary that the first portion and the second portion of the chute in the operating state each extend rectilinearly in a vertical plane extending in the conveying direction. As seen in this vertical plane, the first portion of the chute may also be curved, that is to say may have a variable inclination. However, the chute is usually not curved out of the vertical plane, therefore in other words it does not curve to the side in the conveying direction of the objects.

Since the objects to be sorted are usually not cleaned prior to the sorting, it is provided in one embodiment of the invention that a second laser device is provided for cleaning the objects, wherein the second laser device is arranged upstream of the LIBS laser device, as seen in the conveying direction of the objects, in order to be able to clean the surface of the objects, prior to the measurement, at least in a region that is at least as large as the region of impact of the LIBS laser beam on the object. The cleaned region will usually be larger than the region of impact of the LIBS laser beam. Preferably, each region of impact of the LIBS laser beam will be cleaned by the second laser device.

The prior cleaning of the regions of impact by means of the second laser prevents the situation where dirt or coatings are measured instead of the object material itself. In the worst case, measuring the dirt or the coating would lead to the object not being appropriately separated, as a result of which on the one hand the already separated fraction comprising the particular material would be contaminated and on the other hand an object comprising the sought material may not even be identified.

To prevent the objects to be sorted from becoming stuck in the chute and thus hindering the sorting of the remaining objects, which can lead to high costs as a result of the sorting process being interrupted, it is provided in one embodiment of the invention that the chute has a width that is at least twice as large as the largest object to be sorted. The width of the chute should thus be adapted as far as possible to the size of the objects, so that none of the objects hinder the measurement process. The first portion of the chute may widen, but not narrow, in the direction of the second portion in order to prevent any negative effect on the object sliding process.

In order to make it possible to sort multiple objects in parallel, it is provided in one embodiment of the invention that at least two chutes are arranged parallel to and alongside one another. These chutes will usually be of identical design, but they could also be of different design, for example having different widths.

In particular, the parallel arrangement makes it possible to increase the sorting throughput of the apparatus. In principle, however, it would also be possible to separate out multiple different objects, such as for example metals or ores and/or also objects of different sizes, on the individual chutes. Of course, more than 2 chutes may also be arranged alongside one another, for example 3 or 4 or 5.

In any case, it is necessary that each chute has its own cutout as well as its own LIBS laser device for the LIBS measurement since otherwise the objects cannot be measured and analysed. Furthermore, each chute should have its own separating device in order to be able to divide the objects into the fractions once separation has taken place. It is not necessary for each chute to have its own control device. It would therefore be conceivable that just one common object recognition device and/or one common control device is provided for all chutes.

In particular, if multiple parallel chutes are provided, a device for producing a single-layer object stream and a device for singulating the objects, preferably a vibrating channel, are first arranged upstream of the chutes, as seen in the conveying direction of the objects. This single-layer object stream is subsequently divided, for example by means of multiple channel-shaped fittings, into multiple parallel object streams of objects arranged individually one behind the other, as seen in the conveying direction of the objects. This means that, after the objects have been distributed over the surface, the objects are distributed into rows.

The object of the invention is also achieved by a method according to the invention for sorting objects using an apparatus according to the invention, the method comprising the following steps:

a. singulating the objects in order to move the objects in succession on at least one chute by means of gravity;

b. spectroscopically measuring the objects by means of a LIBS laser device, wherein an object is spectroscopically measured multiple times, preferably at least every 4.5 mm to 5 mm;

c. separating out certain objects by means of a separating device.

Measured multiple times is considered to mean that an object is spectroscopically measured at least twice. It goes without saying that the number of measurements performed depends on the size or length of an object. Therefore, longer or larger objects will usually be measured more frequently than smaller objects.

Any object recognition can take place prior to, at the same time as or after the spectroscopic measurement.

BRIEF DESCRIPTION OF THE FIGURES

The invention will now be explained in greater detail on the basis of exemplary embodiments. The drawings are given by way of example and are intended to explain the concept of the invention but not to restrict it in any way or even conclusively depict it.

In the drawings.

WAYS OF IMPLEMENTING THE INVENTION

Figure 1:
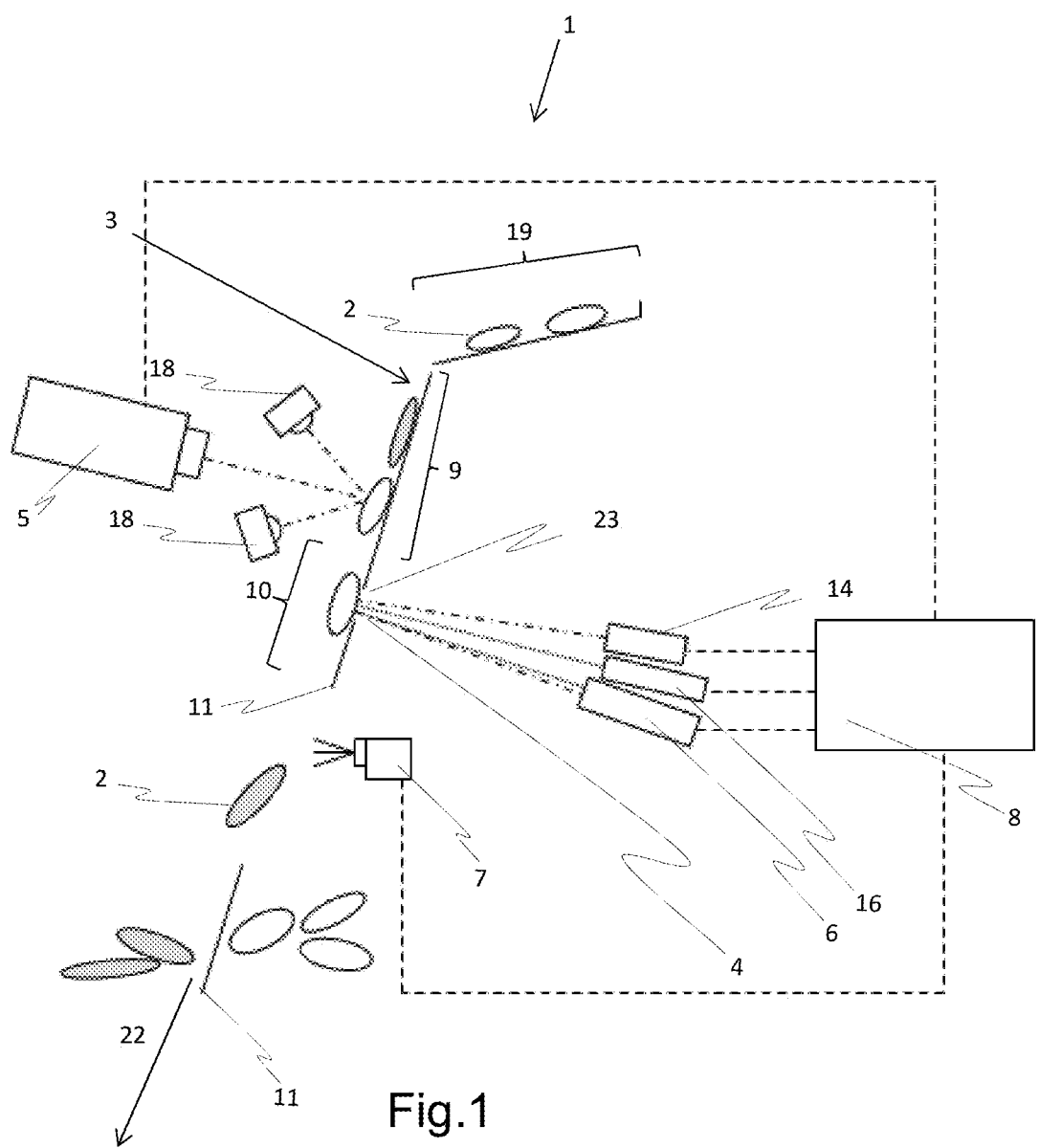
FIG. 1 shows a schematic structure of an embodiment of a sorting apparatus according to the invention, in which the object recognition device is arranged upstream of the LIBS laser device.

FIG. 1 shows the schematic structure of an embodiment of a sorting apparatus 1 according to the invention. The embodiment comprises a chute 3, on which objects 2 can be moved by means of gravitational force, an object recognition device 5, an optional distance measuring device 14, a LIBS laser device 6, a second laser device 16, a control device 8, and a separating device 7. The apparatus further comprises a device 19 for singulating the objects 2, here a vibrating channel, which produces from an object stream a linear arrangement of individual objects 2 so that the LIBS measurement can take place on the objects 2 in succession. The following devices can also be referenced by the expressions object recognizer 5, separator 7, controller 8, distance measurer 14, and singulator 19.

The chute 3 is divided into a first portion 9 and a second portion 10, wherein the objects can first be moved through the first portion 9 and only then pass into the second portion 10 of the chute. The second portion 10 of the chute 3 has a cutout 4, below which the LIBS laser device 6 is arranged, at a distance therefrom, in order to carry out a LIBS measurement through the cutout 4. The LIBS laser device 6 comprises at least one element for generating a laser beam and a detector.

The objects 2 are singulated for example with the aid of the singulating device 19 and then pass in succession onto the first portion 9 of the chute 3. The object 2 is first illuminated by the illumination means 18 and as a result is recognized by the object recognition device 5 and/or the position of the object 2 is ascertained and transmitted to the control device 8. Based on said data, the control device 8 can also calculate when the object will be at the LIBS laser device 6 and at the separating device 7. In principle, it would also be possible that the object recognition device 5 detects further data of the object 2 and delivers to the control device also data relating to the shape, size or height of the object. This means that the object recognition device 5 can create either a two-dimensional image, if only the position and/or shape of the object 2 is of interest, or a three-dimensional image, if for example also the height of object 2 is of relevance. The data from the object recognition device 5 can also be used to determine for how long the object 2 covers the measuring region 23, that is to say how many LIBS measurements should be performed on this object, and where the separating device 7 should act on the object 2, for example which blow-out nozzles of a blow-out nozzle array will be actuated. For example, multiple blow-out nozzles could be actuated transversely to the conveying direction if the object 2 is lying transversely.

If no continuous laser radiation is being emitted, it may be provided on the one hand that the control device 8 gives a signal to the LIBS laser device 6 to carry out a LIBS measurement as soon as the object 2 is passing the cutout 4, behind or below which the LIBS laser device 6 is located, or else pulsed laser radiation is constantly emitted so that the measurement takes place independently of a signal from the object recognition device 5.

Figure 2:
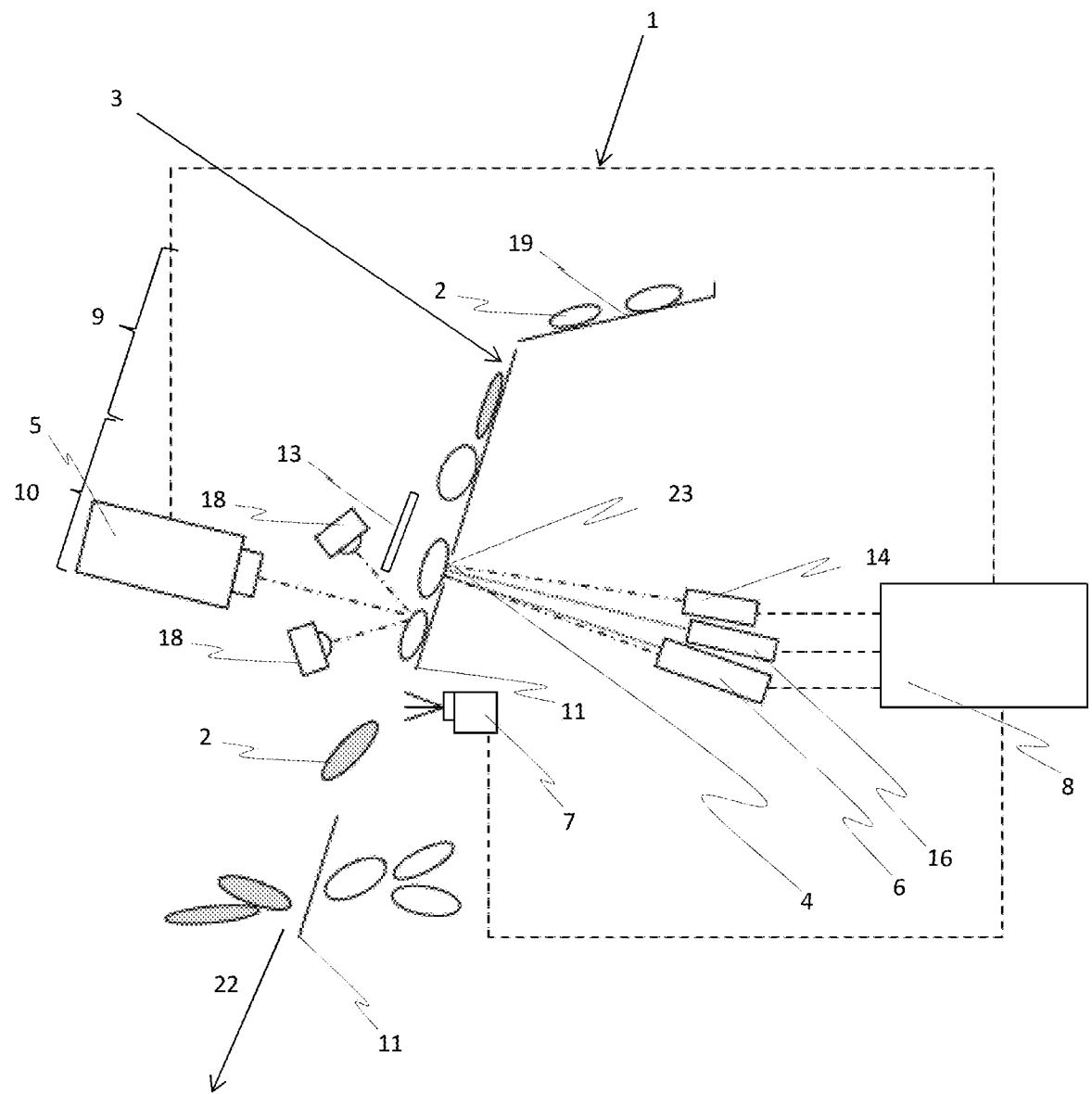
FIG. 2 shows a schematic structure of an embodiment of a sorting apparatus according to the invention, in which the object recognition device is arranged downstream of the LIBS laser device.

FIG. 2 shows an embodiment of an apparatus with continuous laser irradiation, so that the laser of the LIBS laser device 6 generally operates constantly, even when no object 2 is present over the cutout 4. If no object 2 is there to be measured, a so-called empty measurement is carried out, in the case of which no data is transmitted to the control device 8. If, in turn, an object 2 is present over the cutout 4, measurement data will be transmitted to the control device 8 after a successful measurement and the sorting process will be initiated. Since laser radiation is constantly emitted, a laser dump 13 is also provided, which is arranged opposite the LIBS laser device 6 with respect to the chute 3, at a distance from the cutout 4, in order to absorb the radiation emitted by the LIBS laser device 6. The control device 8 also still receives measurement results from the optional distance measuring device 14 arranged upstream of the LIBS laser device 6, as seen in the conveying direction of the objects 2, which distance measuring device measures the distance of the object 2 from the LIBS laser device 6 and thus identifies the distance curve of the object 2 relative to the chute 3 and/or to the LIBS laser device 6, as a result of which errors in the evaluation of the LIBS laser measurements can be avoided.

In addition, a second laser device 16 could be provided upstream of the LIBS laser device 6 in order to free the object 2 of any dirt, at least at the measurement regions on the object 2, prior to the LIBS measurement by means of the LI BS laser device 6. The LIBS laser device 6 carries out a LIBS measurement, wherein the result, that is to say the ascertained measurement data, is sent to the control device 8, which then in turn evaluates the measurement data and sends a signal to the separating device 7 so that the object 2 is separated out if it contains a predefined metal or ore. Based on the measurement data, the separating device 7 may be controlled or adjusted for example in a manner adapted to the shape, position or size of the respective object 2. The objects 2 are subsequently divided into at least two fractions, namely into a fraction comprising objects 2 which contain the predefined element or composition and a fraction comprising objects 2 which do not contain said element or composition. In general, of course, yet another fraction could also be provided, into which the objects 2 that cannot be defined due to an empty measurement can be sorted. For example, a further separating device 7 or further blow-out nozzles could be installed in the existing separating device 7 in order to separate out a third fraction of undefinable objects 2.

In the present case, the object recognition device 5 is a VIS camera and the separating device 7 is a blow-out nozzle or a blow-out nozzle array. In each case one separating device 7 is provided per chute 3, which separating device comprises either one or multiple blow-out nozzle valves.

The embodiment shown in FIG. 2 differs from the embodiment shown in FIG. 1 essentially only in that the object recognition device 5 is arranged downstream of the LIBS laser device 6, as seen in the conveying direction 22 of the objects 2.

By arranging the object recognition downstream of the LIBS laser device 6, there is more time for the LIBS laser measurement and for transmitting the measurement data to the control device 8 since the LIBS laser device 6 can be positioned further away from the lower end 11 of the chute, as seen in the conveying direction 22 of the objects 2. The object recognition in turn takes much less time than the LIBS laser measurement, and therefore the object recognition device 5 can also be arranged downstream of the LIBS laser device 6 without any problem. Another advantage of this arrangement is that the LIBS laser measurement works independently of the data from the object recognition, that is to say is not dependent on the data transmitted by the control device.

Figure 3:
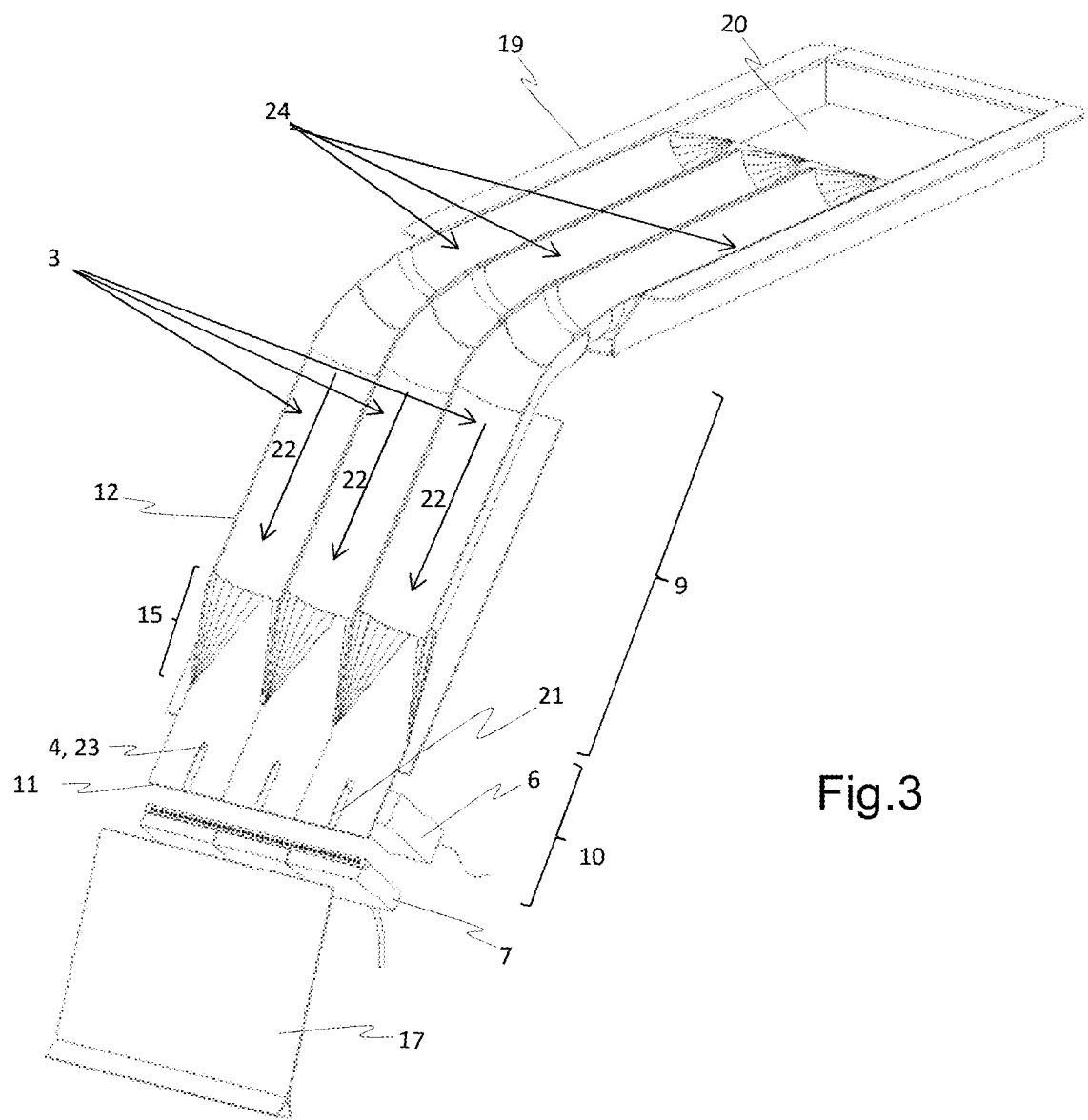
FIG. 3 shows an embodiment of a sorting apparatus according to the invention with three chutes, in a perspective view.

FIG. 3 shows an embodiment comprising three identical chutes 3, each comprising a first portion 9 and a second portion 10. A device for singulating the objects 2 is arranged upstream of the chutes 3, as seen in the conveying direction 22 of the objects 2, said singulating device being in the form of a vibrating channel 19 with a respective channel-shaped guide element 24 per chute 3, which guide element 24 opens in each case into the first portion 9 of a chute 3, preferably in a manner adapted to the cross-section of the chute. The vibrating channel 19, and thus the guide elements 24 thereof, has or have a smaller inclination than the chute 3. A common trough is arranged upstream of the vibrating channel 19, as seen in the conveying direction 22 of the objects 2, which trough serves as a device for producing a single-layer object stream 20. By providing three chutes 3, objects 2 can be separated out simultaneously.

Figure 8:
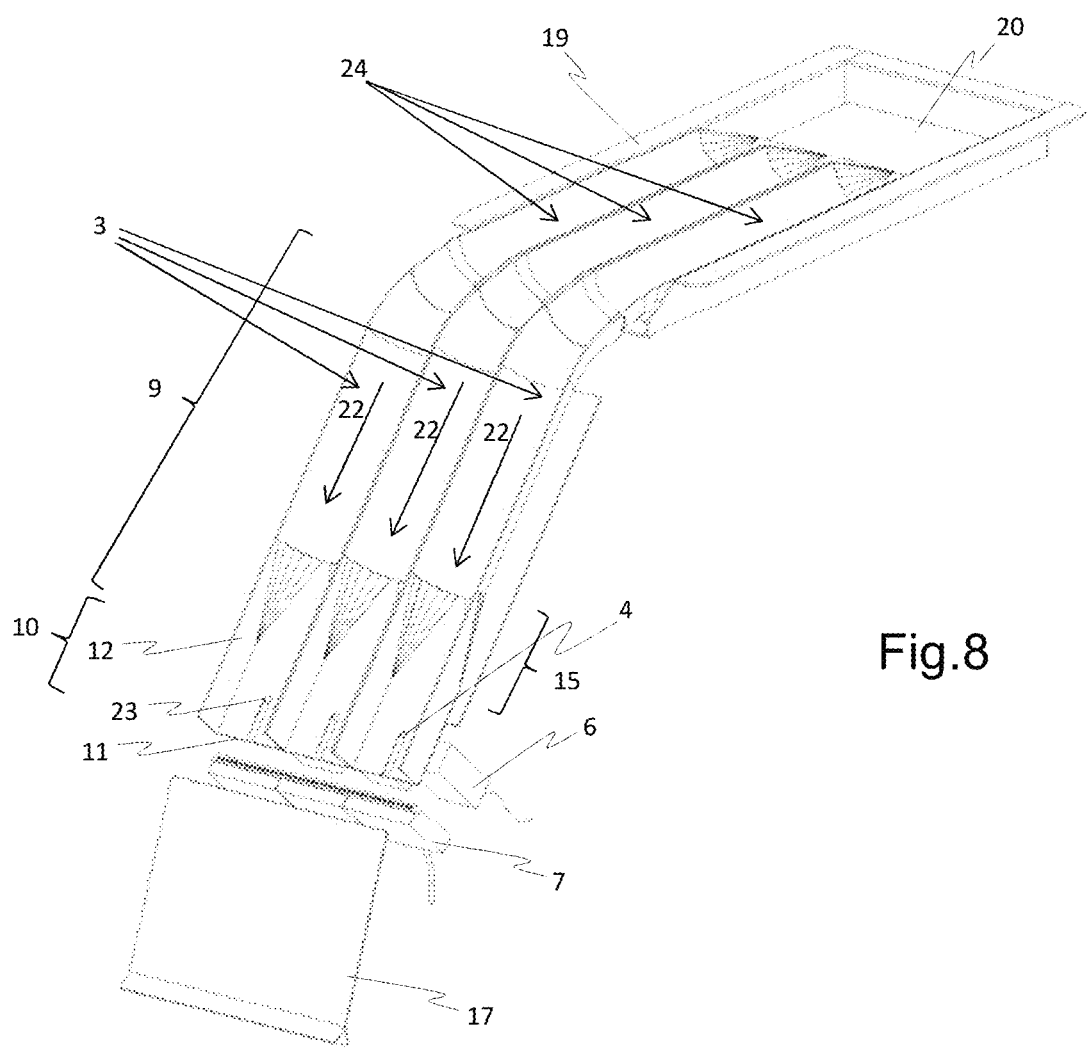
FIG. 8 shows an embodiment of a sorting apparatus according to the invention with three chutes comprising side walls, in a perspective view.

The chute 3 according to the embodiment of FIG. 3 comprises a transition portion 15 which enables a gradual transition from the first portion 9 to the second portion 10, that is to say the cross-section of the first portion 9, here semi-circular, merges continuously into the cross-section of the second portion 10, here a flat bearing surface without side walls 12 (see FIG. 8).

Furthermore, the second portion 10 of the chute has a cutout 4 in the form of a circular hole, which is adjoined by a depression in the form of a web 21 as far as the lower edge 11 of the second portion 10 of the chute 3. The depression in the form of a web 21 prevents dirt from accumulating in the cutout 4 and thus negatively affecting the measurement carried out by the LIBS laser device 6. At the same time, however, the web 21 prevents the LIBS laser device from being damaged by objects 2 passing through the cutout 4. In the embodiments of FIGS. 1 and 2, it can be seen that the LIBS laser device 6 is arranged at a distance from the cutout 4 in order to carry out the measurement from below the chute 3 through the cutout 4.

The embodiment of FIG. 3 further shows a separating device 7 which serves to divide the objects 2 into at least two fractions, either by separating out the objects 2 that have been identified as containing the desired element or the desired composition or the desired content, or by separating out the other objects 2. In the embodiment of FIG. 3, the separating device 7 is realized by blow-out nozzles or a blow-out nozzle array, which can blow the objects 2 over a partition wall 17.

Figure 4:
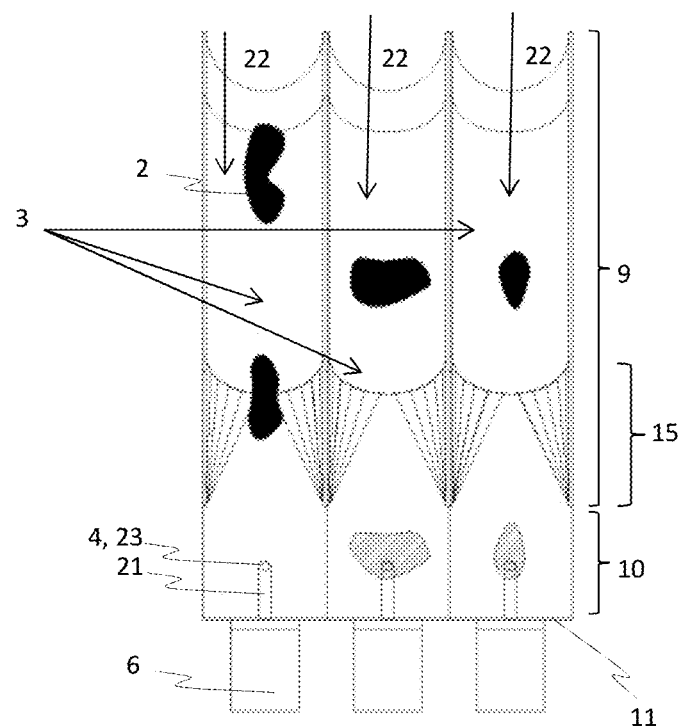
FIG. 4 shows a detail of a plan view on the chutes of the embodiment of the sorting apparatus according to the invention from FIG. 3.

FIG. 4 shows the plan view of an embodiment according to the invention comprising three chutes 3 according to the embodiment of FIG. 3, each of the three chutes 3 comprising a first portion 9, a second portion 10 and a transition portion 15, on which chutes 3 objects 2 are arranged. The first portion 9 of the chute 3 is concave, here semi-circular, while the second portion 10 is flat. The transition portion 15 enables a gradual transition from the concave first portion 9 to the flat second portion 10. The first portion comprises side walls on account of its concave shape, whereas the second portion 10 comprises no side walls, but rather is designed only as a flat panel.

The second portion of each chute 3 has a cutout 4 with a measuring region 23, below which the LIBS laser device 6 is arranged, at a distance therefrom, in order to carry out the measurement through the cutout 4. The measurement takes place in the measuring region 23 at the start of the cutout 4. Two objects 2 located in the measuring region are shown here as transparent so as still to be able to see the cutout 4. The width of the cutout 4, measured here from left to right, is equal to the width of the web 21 and is 10-15% of the width of a second portion 10.

Figure 5:
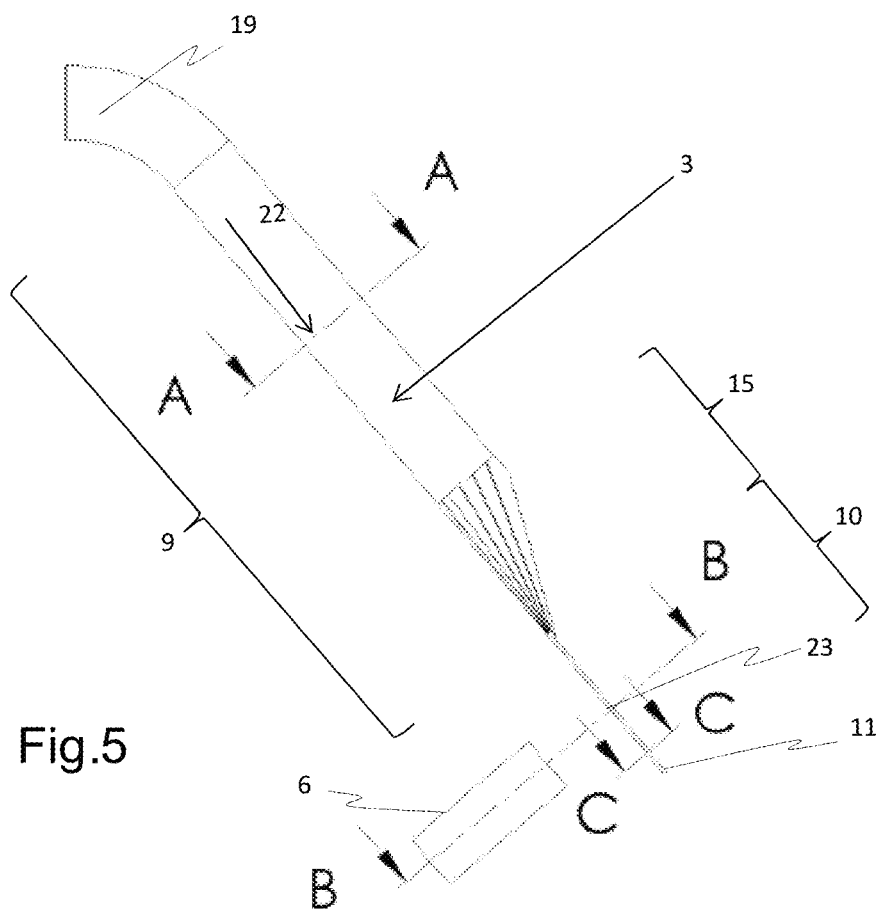
FIG. 5 shows a side view of the embodiment of the sorting apparatus according to the invention from FIG. 3.

FIG. 5 shows a side view of the embodiments of FIGS. 3 and 4. In FIG. 5, it is again possible to see a LIBS laser device 6 for carrying out the LIBS laser measurement through the measuring region 23 of the cutout 4. The chute 3 has walls in the region of the first portion 9, but not in the region of the second portion 10. The second portion 10 is designed only as a flat panel.

Figure 6:
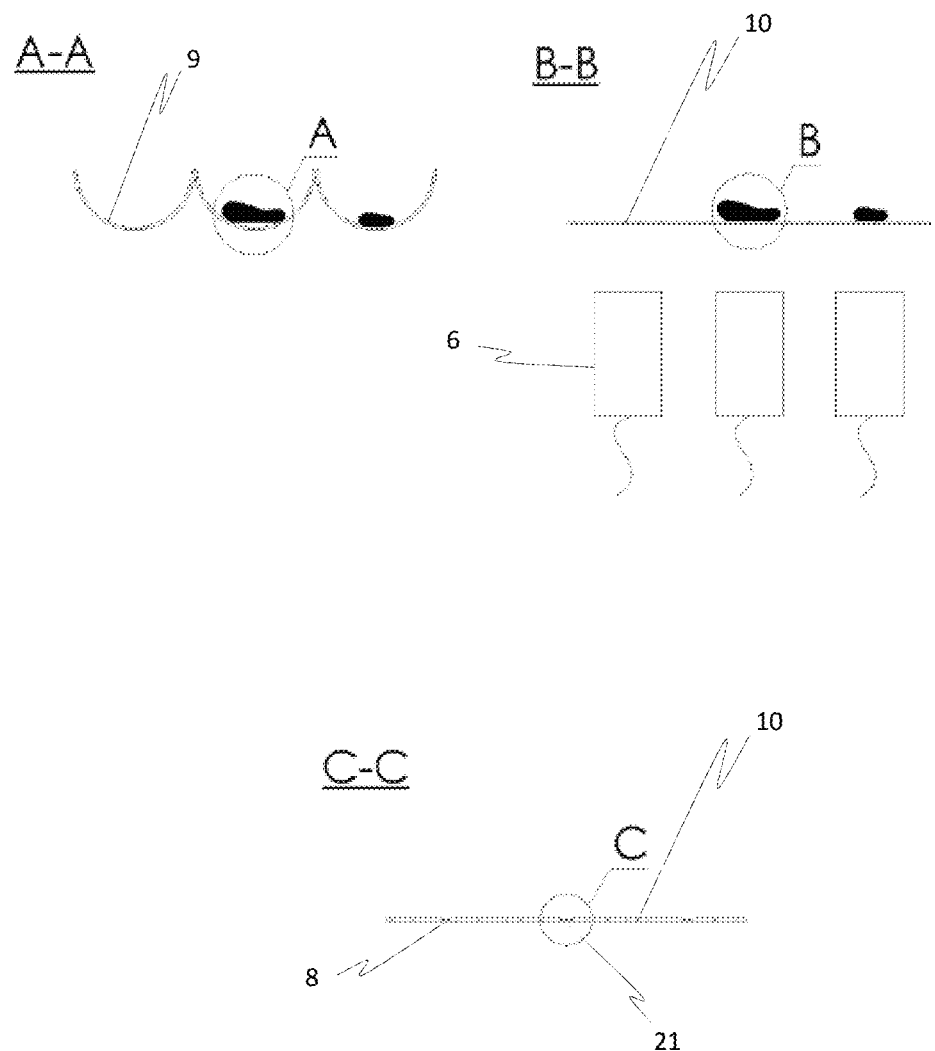
FIG. 6 shows three sections through the first and the second portions of three parallel chutes from the embodiment of FIG. 3.

FIG. 6 shows the arrangement of objects 2, which have a substantially flat bearing surface, in the first, concave portion 9 of the chute 3 (section A-A in FIG. 5) and in the flat second portion 10 (section B-B in FIG. 5). FIG. 6 also shows a diagram of the sectional view in the second portion 10 of the chute without an object 2. This makes it possible to see the cutout 4 of the chute 3 (marked by detail C in the diagram C-C).

Figure 7:
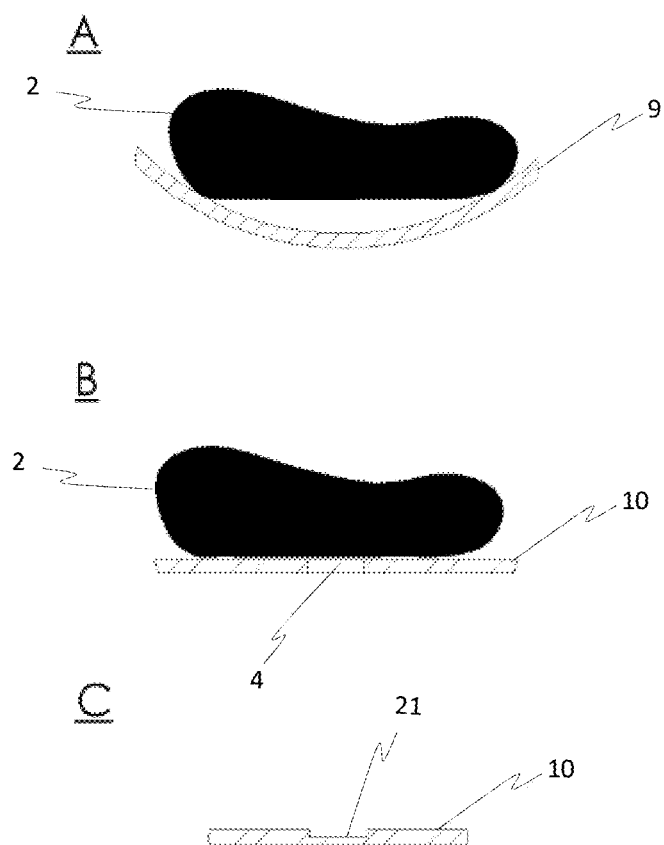
FIG. 7 shows enlarged details of the embodiment of the sorting apparatus according to the invention from FIG. 6.

In FIG. 7, the details A, B and C from FIG. 6 are shown on an enlarged scale. The chute 3 has walls in the portion 9 (section plane A-A) on account of the concave cross-section, whereas it has no side walls 12 in the second portion 10 (section plane B-B and C-C). The second portion 10 is designed as a flat panel.

It can be seen in diagram A that the large object 2 is located with its bearing surface spaced apart from the deepest point of the chute 3 by a distance that depends on the size of the object 2 and also on the concavity of the chute 3. The object is thus arranged in an elevated manner in the chute 3. Due to the resulting varying distance of the object 2 from a LIBS laser device 6, measurement fluctuations and associated measurement errors could occur in this portion.

In the second portion 10 (diagram B), on the other hand, the bearing surface of the object 2 rests fully on the deepest point of the chute 3, which in the narrower sense does not exist since all points on the second portion 10 of the chute 3 lie in one plane, as a result of which objects 2 are always at the same distance from the LIBS laser device 6. Measurement fluctuations caused by different distances from the LIBS laser device 6 are thereby reduced.

Diagram C once again shows the section plane of the chute 3 in the portion 10, wherein it is possible to see the design of the web 21 at the lower end 11 of the chute 3. As seen in the conveying direction 22 of the objects 2, the cutout 4 is terminated at the end by a web 21. The web 21 is less thick than the surrounding second portion 10, so that a depression is formed in the second portion 10 on the upper side of the web 21 in partial continuation of the cutout 4. Material abraded from analysed objects 2 can slide down along the depression formed by the web 21.

FIG. 8 shows a sorting apparatus 1 which largely corresponds to that of the embodiment of FIG. 3. The two apparatuses differ only in that the sorting apparatus 1 in the embodiment of FIG. 8 has perpendicular walls 12 in the second portion 10, whereas this is not the case in the embodiment of FIG. 3.

Figure 9:
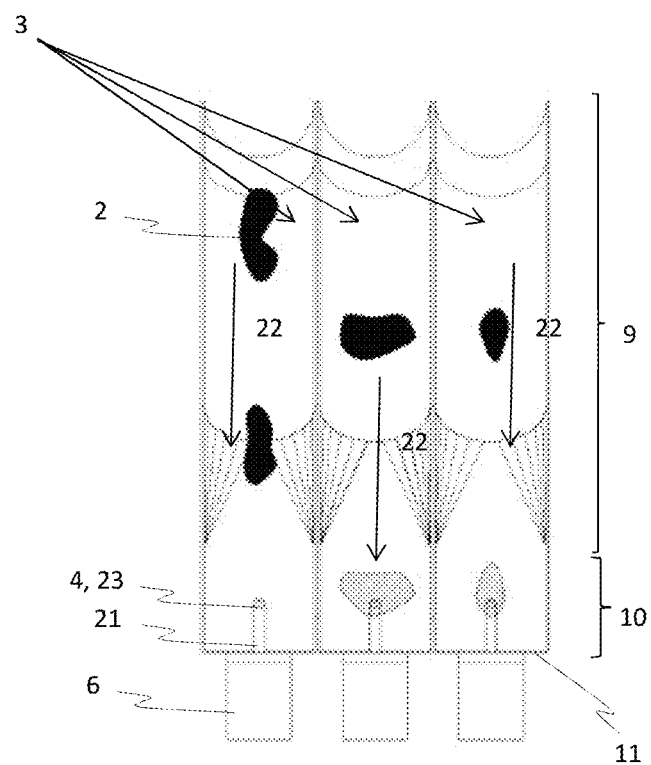
FIG. 9 shows a detail of a plan view of the chutes of the embodiment of the sorting apparatus according to the invention from FIG. 8.

FIG. 9 shows the plan view of three chutes 3 corresponding to the plan view in FIG. 4. The chutes 3 of the two apparatuses differ only in that the chutes 3 according to the embodiment of FIG. 9 have side walls 12 in the second portion 10, whereas this is not the case in FIG. 4.

Figure 10:
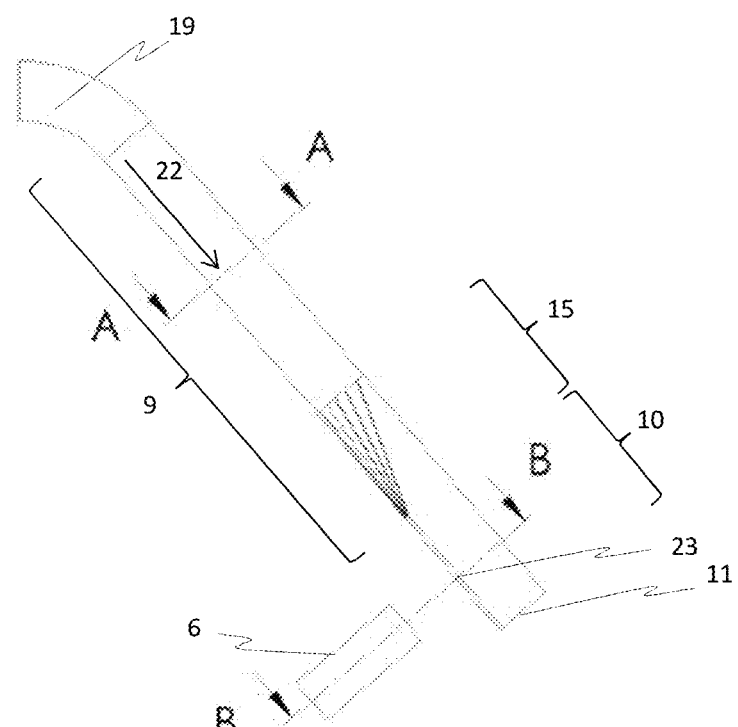
FIG. 10 shows a side view of the embodiment of the sorting apparatus according to the invention from FIG. 8.

FIG. 10 shows a side view corresponding to the diagram in FIG. 5. The chute 3 differs from the chute of FIG. 5 only in that the chute 3 according to the embodiment of FIG. 10 has side walls 12 in the second portion 10, whereas this is not the case in the embodiment shown in FIG. 5.

LIST OF REFERENCE SIGNS 1 sorting apparatus
2 object
3 chute 4 cutout
5 object recognition device
6 LIBS laser device
7 separating device
8 control device
9 first portion
10 second portion
11 lower end
12 side wall
13 laser dump
14 distance measuring device
15 transition portion
16 second laser device
17 partition wall
18 illumination means
19 device for singulating the objects (vibrating channel)
20 device for producing a single-layer object stream
21 web
22 conveying direction
23 measuring region
24 channel-shaped guide elements of the device 19

The invention claimed is:

1. A sorting apparatus for sorting objects, the sorting apparatus comprising at least:
a chute on which the objects can be moved in succession in a conveying direction by means of the acting gravitational force, the chute having a cutout comprising a measuring region;
a LIBS laser device arranged adjacent to a cutout of the chute to carry out, through the cutout, a spectroscopic measurement on the objects moving along the chute;
a separator for separating out certain objects; and
a controller for controlling and/or adjusting the separator as a function of the measurement results of the LIBS laser device;
the chute comprising at least a first portion and a second portion;
the first portion of the chute, through which the objects can be moved first, being configured so that the objects moving along the first portion are centered normal to the conveying direction by gravitational force, and the second portion of the chute is configured to be flat; and
the cutout comprising the measuring region being arranged in the second portion of the chute.

2. The sorting apparatus according to claim 1, wherein:
the first portion of the chute is configured to be concave since a conveying surface of the first portion, as seen in section normal to the conveying direction is arranged to be at least partially inclined; and
the second portion of the chute has no inclined conveying surface as seen in section normal to the conveying direction.

3. The sorting apparatus according to claim 1, wherein:
the chute has a width and the second portion of the chute has a lower end; and
the measuring region of the cutout is arranged at least half the width of the chute above the lower end of the second portion of the chute.

4. The sorting apparatus according to claim 1, wherein:
the cutout of the chute extends in the form of a slot in the conveying direction as far as a lower end of the second portion of the chute; and
the measuring region of the cutout, as seen in the conveying direction, is arranged at a distance from the lower end of the second portion of the chute.

5. The sorting apparatus according to claim 1, wherein:
a depression adjoins the cutout in the conveying direction.

6. The sorting apparatus according to claim 5, wherein:
the second portion of the chute has a material thickness that is reduced down to a web in order to form the depression.

7. The sorting apparatus according to claim 1, wherein:
the second portion of the chute comprises side walls that extend vertically, as seen in section normal to the conveying direction to keep an object on the second portion.

8. The sorting apparatus according to claim 1, wherein:
the second portion of the chute comprises no side walls.

9. The sorting apparatus according to claim 1, further comprising:
an object recognizer configured to detect at least a position of an object on the chute; and
the object recognizer is arranged upstream of the LIBS laser device, as seen in the conveying direction of the objects.

10. The sorting apparatus according to claim 1, wherein:
the LIBS laser device is configured to emit laser radiation continuously; and
the sorting apparatus further comprises a laser dump for absorbing the laser radiation, the laser dump being arranged opposite the LIBS laser device in relation to the chute, as seen in the direction of the laser radiation.

11. The sorting apparatus according to claim 1, further comprising:
an object recognizer configured to detect at least a position of an object on the chute; and
the object recognizer is arranged downstream of the LIBS laser device as seen in the conveying direction of the objects.

12. The sorting apparatus according to claim 1, wherein:
the sorting apparatus is configured in such a way that an object is spectroscopically measured multiple times.

13. The sorting apparatus according to claim 1, wherein:
the sorting apparatus is configured in such a way that an object is spectroscopically measured multiple times at least every 4.5 mm to 5 mm.

14. The sorting apparatus according to claim 1, further comprising:
a distance measurer configured to determine a distance of an objects on the chute from the LIBS laser device.

15. The sorting apparatus according to claim 1, wherein:
a transition from the first portion to the second portion of the chute is abrupt.

16. The sorting apparatus according to claim 1, further comprising:
a second laser device configured to dean the objects, the second laser device being arranged upstream of the LIBS laser device, as seen in the conveying direction of the objects.

17. The sorting apparatus according to claim 1, wherein:
at least two chutes are arranged parallel to and alongside one another.

18. A method for sorting objects using an apparatus according to claim 1, the method comprising the following:
a. singulating the objects to move the objects in succession on the chute by gravity;
b. spectroscopically measuring the objects by the LIBS laser device, wherein an object is spectroscopically measured multiple times;
c. separating out certain objects by the separator.

19. The method for sorting objects using an apparatus according to claim 18, wherein:
an object is spectroscopically measured multiple times, at least every 4.5 mm to 5 mm.

20. The sorting apparatus according to claim 1, wherein:
the cutout of the chute extends in the form of a slot in the conveying direction as far as a lower end of the second portion of the chute; and
the measuring region of the cutout, as seen in the conveying direction, is arranged at a distance from the lower end of the second portion of the chute, and at a region of the slot located farthest away from the lower end of the second portion of the chute.

21. The sorting apparatus according to claim 1, wherein:
a depression adjoins the cutout in the conveying direction as far as a lower end of the second portion of the chute.

\* \* \* \* \*